United States Patent
Yamamoto et al.

[11] Patent Number: 6,118,420
[45] Date of Patent: Sep. 12, 2000

[54] DISPLAY DEVICE USING TRANSPARENT TYPE LCD

[75] Inventors: Yoshiharu Yamamoto; Motonobu Yoshikawa; Kazutake Boku, all of Osaka, Japan

[73] Assignee: Matsushita Electric Industrial Co., Ltd., Osaka, Japan

[21] Appl. No.: 08/957,147

[22] Filed: Oct. 24, 1997

[30] Foreign Application Priority Data

Oct. 29, 1996 [JP] Japan ................................. 8-287111

[51] Int. Cl.$^7$ ....................................... G09G 3/18
[52] U.S. Cl. ................... 345/87; 345/7; 349/62; 349/65
[58] Field of Search .................. 345/7, 8, 9, 4, 345/5, 38, 50, 87, 102; 349/45, 48, 62, 65, 63, 64, 66, 67; 359/13, 14

[56] References Cited

U.S. PATENT DOCUMENTS 5,099,343  3/1992  Margerum et al. ................ 359/48

Primary Examiner—Bipin Shalwala
Assistant Examiner—Jimmy Hai Nguyen
Attorney, Agent, or Firm—Merchant & Gould P.C.

[57] ABSTRACT

A display device comprises a transparent type LCD including a pair of transparent plates facing each other, spaced with a predetermined gap and a polymer dispersed liquid crystal disposed between the transparent plates, which can be switched between a transparent state and a diffraction state pixel by pixel to display images or characters; a signal generator for giving display signals to the transparent type LCD; and a light system including a light source emitting light rays that enter the transparent plates from their edge faces, and a stop plate disposed between the edge faces of the transparent plates and the light source. This stop plate has an opening that extends along the longitudinal direction of the edge face of the transparent plate, and the width of the opening in the cross direction changes cyclically along the longitudinal direction.

16 Claims, 14 Drawing Sheets

DISPLAY DEVICE USING TRANSPARENT TYPE LCD

BACKGROUND OF THE INVENTION

This invention relates to a display device with which an observer can see images or characters superimposed on a background view, and which may be used for a car, a ship or other vehicles, or a measurement instrument.

Such a display device having a transparent property is disclosed in Japanese laid open patent application (Tokukaihei) 7-96771 or 7-315075, for example. This display device enables an observer, e.g., a driver, to see information images or characters without turning his or her eyes away from a view that can be seen through a windshield. This type of display, which is called a "heads up display", has a following configuration.

A transparent type LCD (Liquid Crystal Display) on which a certain information image is displayed is lighted by a light system including a halogen lamp and a condenser lens. The obtained light ray containing the displayed image is reflected by plural mirrors sequentially and finally by a semitransparent mirror to reach eyes of the observer. The semitransparent mirror is disposed in a windshield of the car, or on the surface of the windshield, or close to the windshield. Therefore, the information displayed on the LCD is observed as a virtual image behind the semitransparent mirror by the observer. In other words, the observer can see the information superimposed on the outside view that can be seen through a windshield.

However, the above-mentioned display in the prior art has some disadvantages. It is difficult to see the image of the information in the bright external light of a sunny day. To keep good visibility for the information image, a high intensity light source is required for the light system. As a result, power consumption increases, and a space and/or device for cooling the light source is necessary.

Moreover, in the above-mentioned display, the transparent type LCD, halogen lamp and other members for forming images are disposed distantly from the windshield. The displayed image has to travel by reflecting on the plural mirrors from the LCD to the neighborhood of the windshield. Therefore, the contour of the whole display apparatus is large, so that a large space for housing the apparatus is required in a dashboard, for example. Additionally, the visibility of the display is not good since the intensity of the displayed image is not uniform due to unevenness of lighting that is intrinsic to the light system. To improve the uniformity of the intensity the light system must become larger and/or more complicated.

SUMMARY OF THE INVENTION

This invention is aimed at realizing a power-saving and small sized display device that can display information images superimposed on a background view with uniform intensity over the whole display area.

A first configuration of the display device according to the present invention comprises a transparent type LCD including a pair of transparent plates facing each other, spaced with a predetermined gap, and a polymer dispersed liquid crystal disposed between the transparent plates, which can be switched between a transparent state and a diffraction (i.e., non-transparent) state pixel by pixel to display images or characters; a signal generator for giving display signals to the transparent type LCD; and a light system including a light source emitting light rays that enter the transparent plates from their edge faces and a stop plate disposed between the edge faces of the transparent plates and the light source.

It is preferable that the stop plate has an opening that extends along the longitudinal direction of the edge face of the transparent plate, and the width of the opening in the cross direction changes along the longitudinal direction. More preferably, the width of the opening changes step by step and cyclically. Alternately, the stop plate may include a transparent substrate and a low-transparency film formed on the substrate having an opening that makes a transparent area extending along the longitudinal direction of the edge face of the transparent plate, and the width of the transparent area in the cross direction may changes along the longitudinal direction.

It is also preferable that the stop plate includes a substrate and a film formed on the substrate for limiting the transparency, and the transparency of the stop plate varies along the cross direction such that the transparency is maximum in the middle and decreases gradually toward the edges.

A second configuration of the display device according to the present invention comprises a transparent type LCD including a pair of transparent plates facing each other, spaced with a predetermined gap, and a polymer dispersed liquid crystal disposed between the transparent plates, which can be switched between a transparent state and a diffraction state pixel by pixel to display images or characters; a signal generator for giving display signals to the transparent type LCD; and a light system including a light source emitting light rays that enter the transparent plates from their edge faces and a pair of parallel plates facing each other and defining an elongated space between the edge faces of the transparent plates and the light source.

It is preferable that the edge contour of the parallel plates on the side closer to the transparent plates changes along the longitudinal direction. More preferably, the edge contour of the parallel plates has a step and cyclic shape along the longitudinal direction.

A display device having the above-mentioned configurations of the present invention can display images or characters superimposed on a background view by using a polymer dispersed liquid crystal that can be switched between a transparent state and a diffraction state. This display device can be power-saving and compact. In addition, this display device can realize uniform intensity over the whole display area by using the stop plate or the parallel plates included in the light system for lighting the transparent plates from their edge faces.

DETAILED DESCRIPTION OF THE PREFERRED EMBODIMENTS (First Embodiment)

Figure 1:
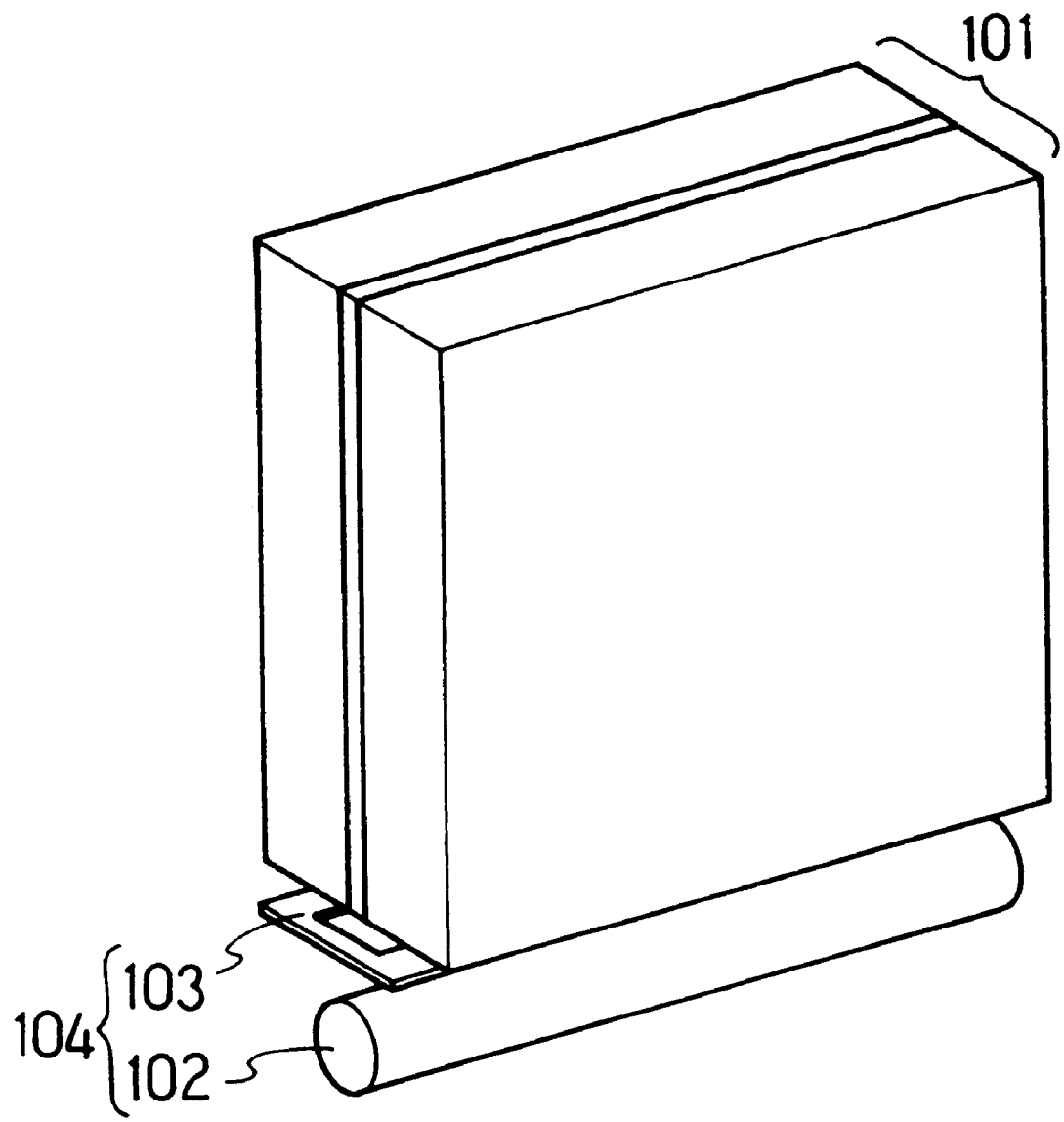
FIG. 1 is a perspective view showing a schematic configuration of a display device according to a first embodiment of the present invention.

A display device according to a first embodiment of the present invention is shown in FIG. 1. Transparent type LCD 101 between a transparent state and a diffraction (i.e., non-transparent) comprises a polymer dispersed liquid crystal that can be switched state in which light rays are scattered. The polymer dispersed liquid crystal is disposed between two transparent plates on which transparent electrodes are formed. This transparent type LCD 101 displays images and/or characters by switching the state of the polymer dispersed liquid crystal pixel by pixel according to a signal from a conventional signal generator (not shown in the figure). Light system 104, which lights an edge face of each of the transparent plates for lighting the transparent type LCD, comprises a cold-cathode tube 102 and a stop plate 103 disposed between the cold-cathode tube 102 and the transparent plates.

Figure 2:
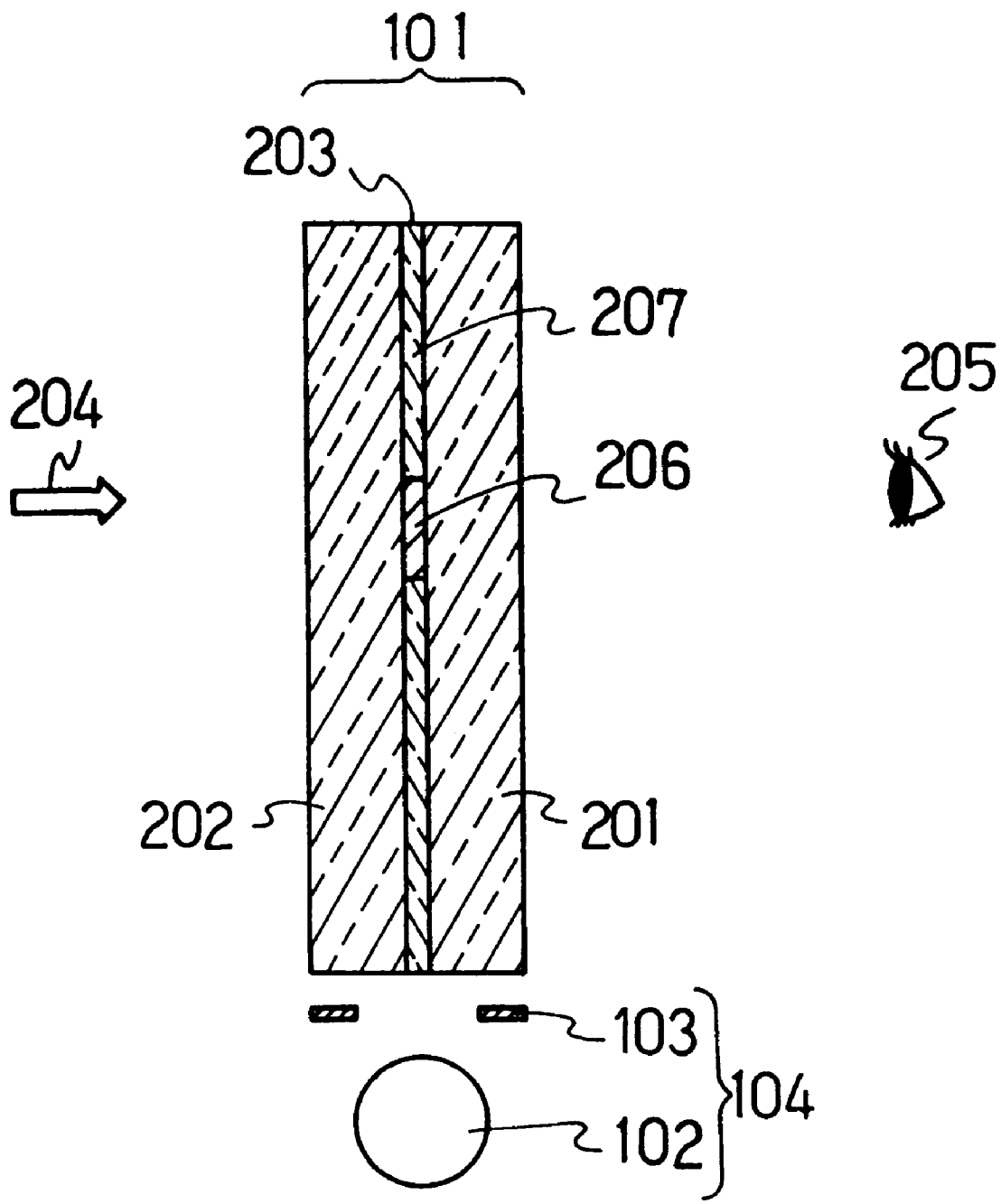
FIG. 2 is a cross section of the display device shown in FIG. 1.

As shown in FIG. 2, the polymer dispersed liquid crystal 203 is disposed between two transparent plates 201, 202 on which transparent electrodes are formed. The polymer dispersed liquid crystal 203 is divided into transparent pixels 207 and diffraction (non-transparent) pixels 206 that scatter light rays. The transparent pixels 207 pass light rays from the outside view, which can reach the eyes 205 of an observer, while diffraction pixels 206 scatter the light rays and have a glittering appearance. Thus, the observer can see an image from the diffraction pixels 206 superimposed on the outside view.

The stop plate 103 is used for making the light intensity uniform over the whole display area of the transparent type LCD 101 from the proximal edge to the distal edge with respect to the light system 104. Light rays from the light system 104 enter the transparent plates 201, 202 from their proximal edge faces, and propagate inside of each of transparent plates 201, 202, which work as a light guide, to reach the distal edge faces of the transparent plates 201, 202. The light rays inside the transparent plates 201, 202 decay with propagation due to the absorbing property of the transparent plates 201, 202. Therefore the light intensity tends to be lower in a distal portion than in a proximal portion of the display area. However, since the stop plate 103 limits light rays that reach the proximal portion of the display area directly from the cold-cathode tube 102, the light intensity becomes uniform over the display area.

Figure 3:
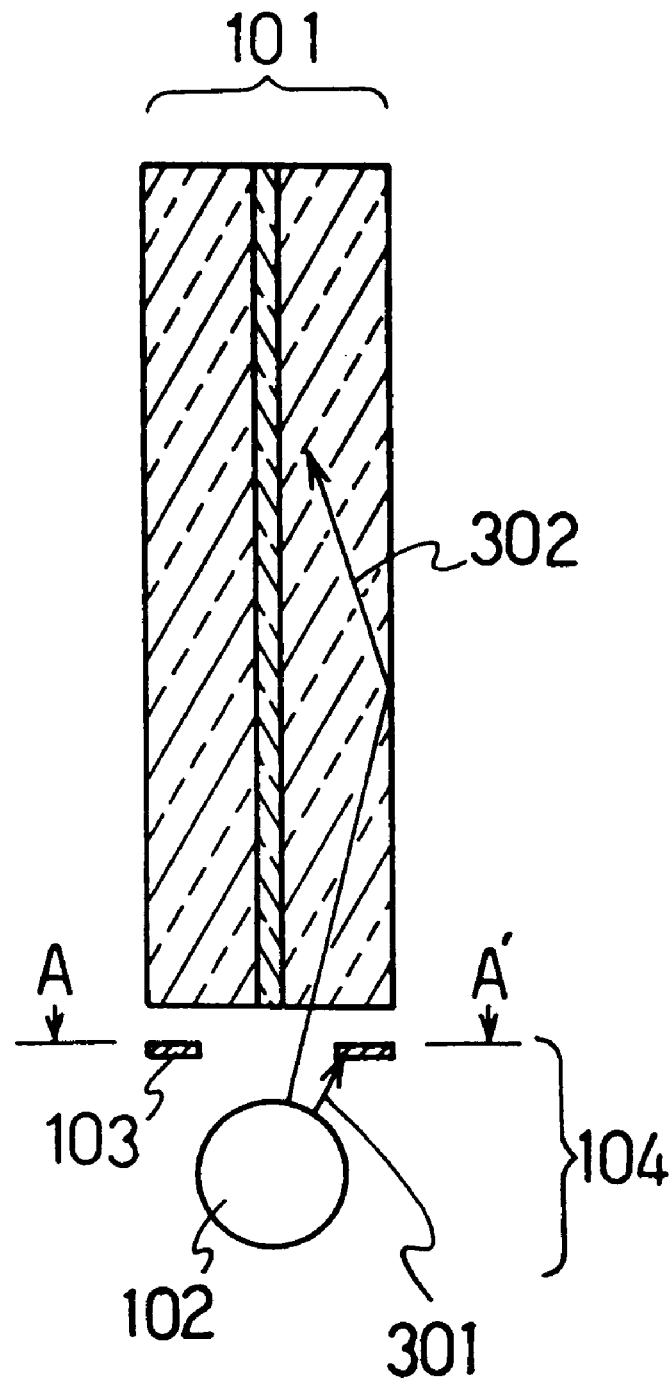
FIG. 3 is a cross section of the display device illustrating a function of making intensity distribution uniform over the display area.

FIG. 3 illustrates the function of the stop plate 103 for making the light intensity uniform over the display area. Some of the light rays from the cold-cathode tube 102 of the light system 104 that are directed to the proximal portion of the display area are not allowed to pass through the stop plate 103 as shown with 301 in FIG. 3, while light rays that are directed to the distal portion of the display pass through the stop plate 103 without any limitation as shown with 302 in FIG. 3. Thus, the light intensity becomes uniform over the whole display area. If all of the light rays that are directed to the proximal portion of the display area are interrupted by the stop plate 103, the light intensity in the proximal portion of the display area may become too low. Therefore, the width of the opening in the stop plate 103 changes along the longitudinal direction of the stop plate 103 as explained below.

Figure 4:
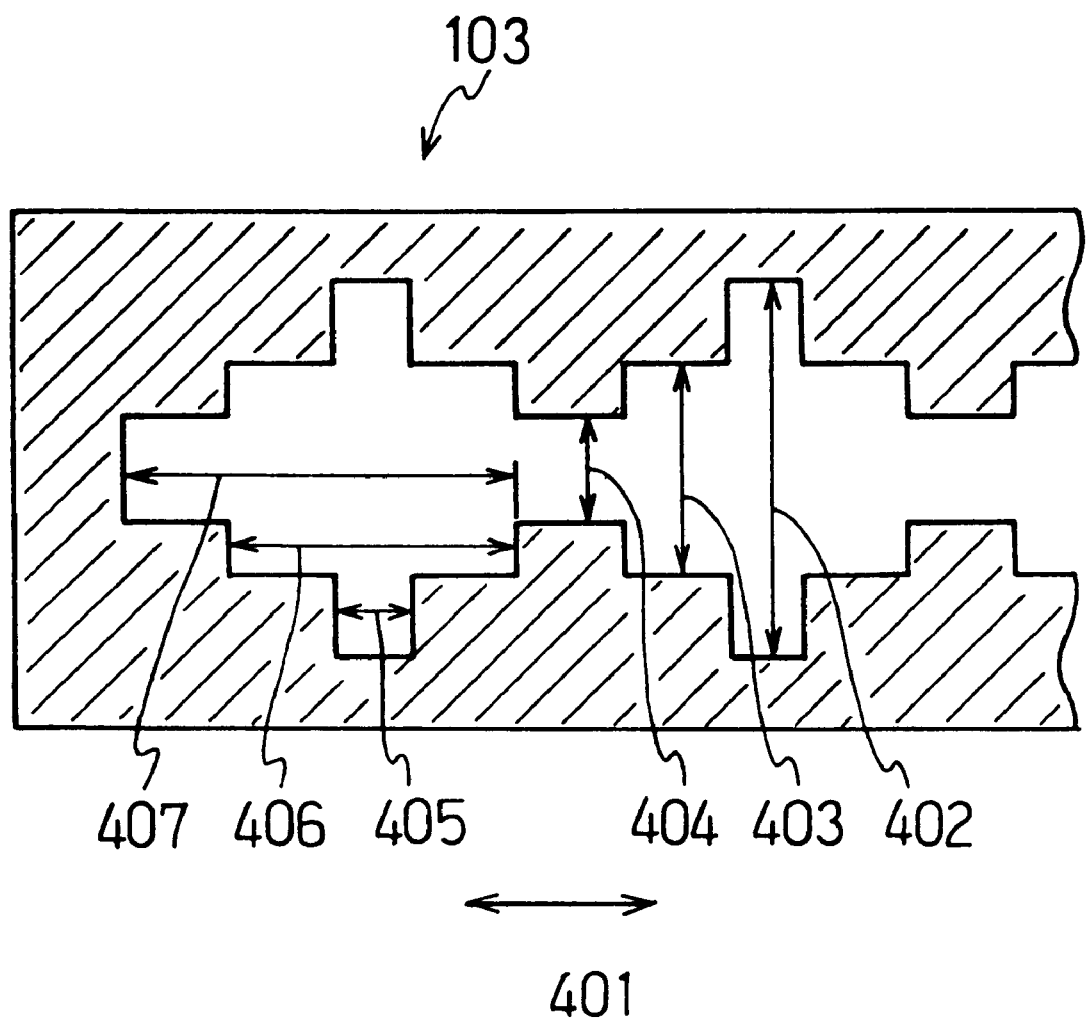
FIG. 4 is an enlarged partial plan view of a stop plate with a specified opening constituting a light system of the display device shown in FIG. 1.

FIG. 4 is an enlarged partial plan view of the stop plate from A–A' direction in FIG. 3. The opening of the stop plate 103 extends along the longitudinal direction 401 of the stop plate (i.e., the longitudinal direction of the transparent type LCD). The width of the opening changes step by step and cyclically along the longitudinal direction as shown with 402, 403 and 404 in FIG. 4. The non-uniformity of the light intensity along the longitudinal direction of the display area becomes smaller if the period of the width change cycle is shorter, though a process cost should be taken into consideration for determining the period.

The ratio of light amounts for lighting the proximal portion and the distal portion of the display area can be changed by changing the ratios of lengths 405, 406 and 407 for opening widths 402, 403 and 404 along the longitudinal direction. Therefore, the ratios of lengths 405, 406 and 407 are determined so as to compensate the attenuation of the light intensity, which depends on the path length of the light ray propagating in the transparent plate. The step number of width change is three in this embodiment as shown in FIG. 4. However, the step number can be two or above three as long as the uniformity of light intensity is obtained.

(Second Embodiment)

Figure 5:
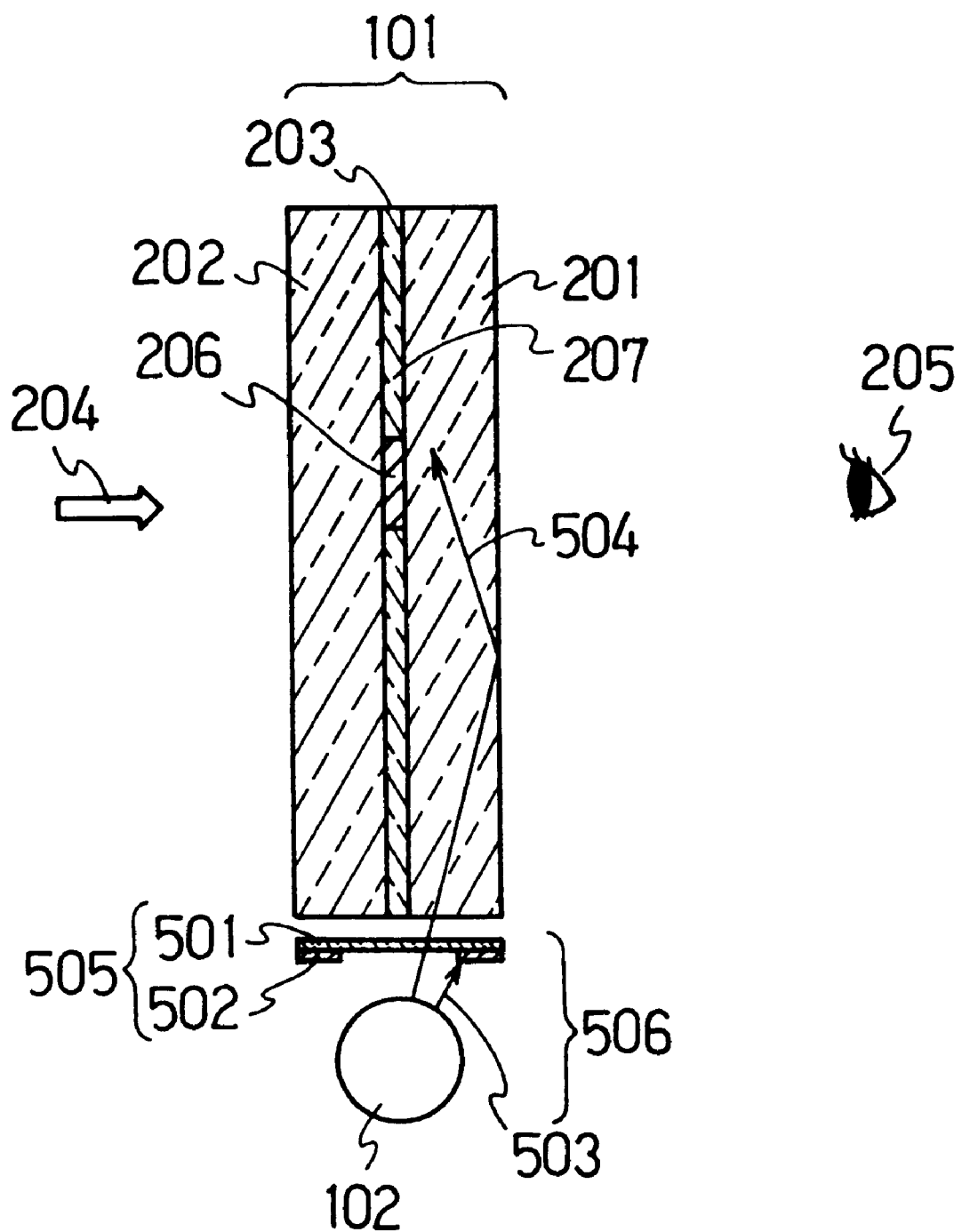
FIG. 5 is a cross section of a display device according to a second embodiment of the present invention.

FIG. 5 shows a cross section of a display device according to a second embodiment of the present invention. Transparent type LCD 101 comprises a polymer dispersed liquid crystal 203 that can be switched between a transparent state and a diffraction (non-transparent) state in which light rays are scattered. The polymer dispersed liquid crystal 203 is disposed between two transparent plates 201, 202 on which transparent electrodes are formed. This transparent type LCD 101 displays images and/or characters by switching the state of the polymer dispersed liquid crystal pixel by pixel according to a signal from a conventional signal generator (not shown in the figure). Light system 506, which lights an edge face of each of the transparent plates 201, 202 for lighting the transparent type LCD, comprises a cold-cathode tube 102 and a stop plate 505 disposed between the cold-cathode tube 102 and the edge faces of the transparent plates 201, 202.

The polymer dispersed liquid crystal 203 is divided into transparent pixels 207 and diffraction pixels 206 that scatter light rays in accordance with a signal from a signal generator. The transparent pixels 207 pass light rays from the outside view, which can reach eyes 205 of an observer, while diffraction (non-transparent) pixels 206 scatter the light rays and have a glittering appearance. Thus, the observer can see an image from the diffraction pixels 206 superimposed on the outside view.

The stop plate 505 has a function to make the light intensity uniform over the whole display area of the transparent type LCD 101 from the proximal portion to the distal portion with respect to the light system 506. Light rays from the light system 506 enter the transparent plates 201, 202 from their proximal edge faces, and propagate inside of each of transparent plates 201, 202, which work as a light guide, to reach the distal edge faces of the transparent plates 201, 202. The light rays inside the transparent plates 201, 202 decay along with propagation due to the absorbing property of the transparent plates 201, 202. Therefore the light intensity tends to be lower in a distal portion than in a proximal portion of the display area. The stop plate 505 is used to limit the light rays that reach the proximal portion of the display area directly from the cold-cathode tube 102 so that the light intensity becomes uniform over the display area. Some of the light rays from the cold-cathode tube 102 of the light system 506 that are directed to the proximal portion of the display area are not allowed to pass through the stop plate 505 as shown with 503 in FIG. 5, while light rays that are directed to the distal portion of the display pass through the stop plate 505 without any limitation as shown with 504 in FIG. 5. Thus, the light intensity becomes uniform over the whole display area. If all of the light rays that are directed to the proximal portion of the display area are prevented from passing through the stop plate 505, the light intensity at the proximal portion may become too low. Therefore, the width of the opening in the stop plate 505 changes along the longitudinal direction of the stop plate 505 as explained below.

Figure 6:
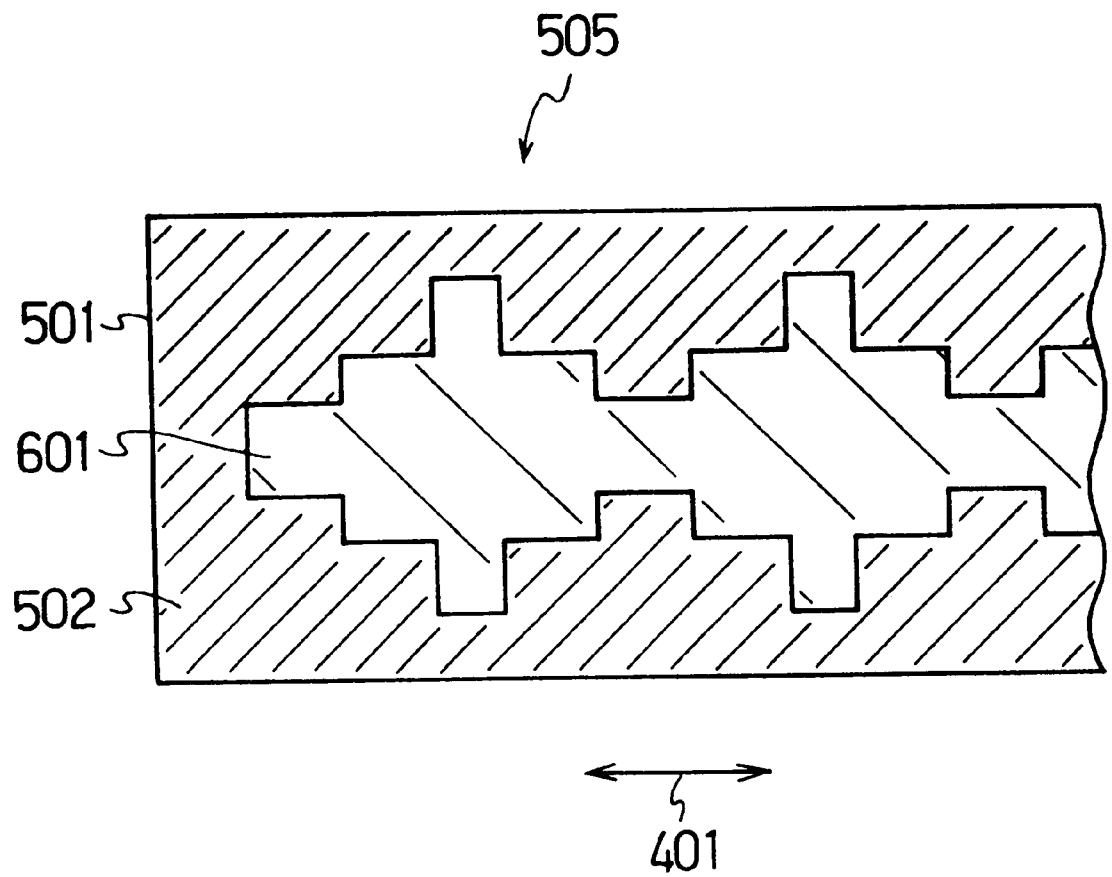
FIG. 6 is an enlarged partial plan view of a stop plate with a specified transparent portion constituting a light system of the display device shown in FIG. 5.

The stop plate 505 of this embodiment is made by forming a film 502 having a low transparency on a transparent substrate 501, and forming an opening in the film that extends along the longitudinal direction of the transparent LCD. The film having low transparency is formed by high-vacuum metal deposition of chromium, aluminum or other metal on the transparent substrate 501. In this metal deposition process, the opening (i.e., transparent portion) is formed by proper masking. FIG. 6 shows a contour of the opening (transparent portion) 601 formed in a low transparency film 502 that is formed on the surface of the transparent substrate 501. The transparent portion 601 extends along the longitudinal the direction of the stop plate (the longitudinal direction of the transparent type LCD) 401. The width of the transparent portion 601 changes step by step and cyclically along the longitudinal direction. Thus, the light intensity becomes uniform over the display area in the same way as the first embodiment.

Figure 7:
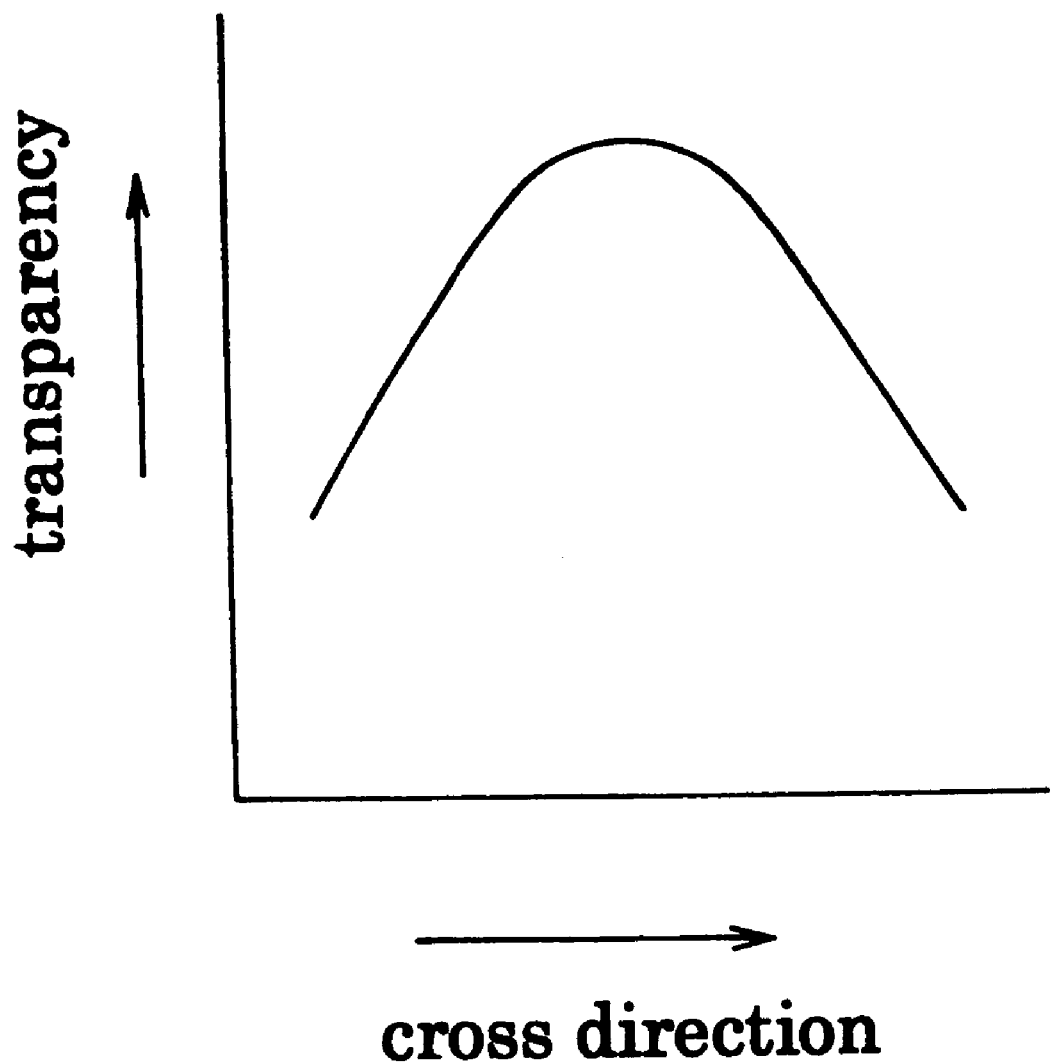
FIG. 7 is a graph showing a transparency distribution of a stop plate that is a variation of that shown in FIG. 5 and 6.
Figure 8:
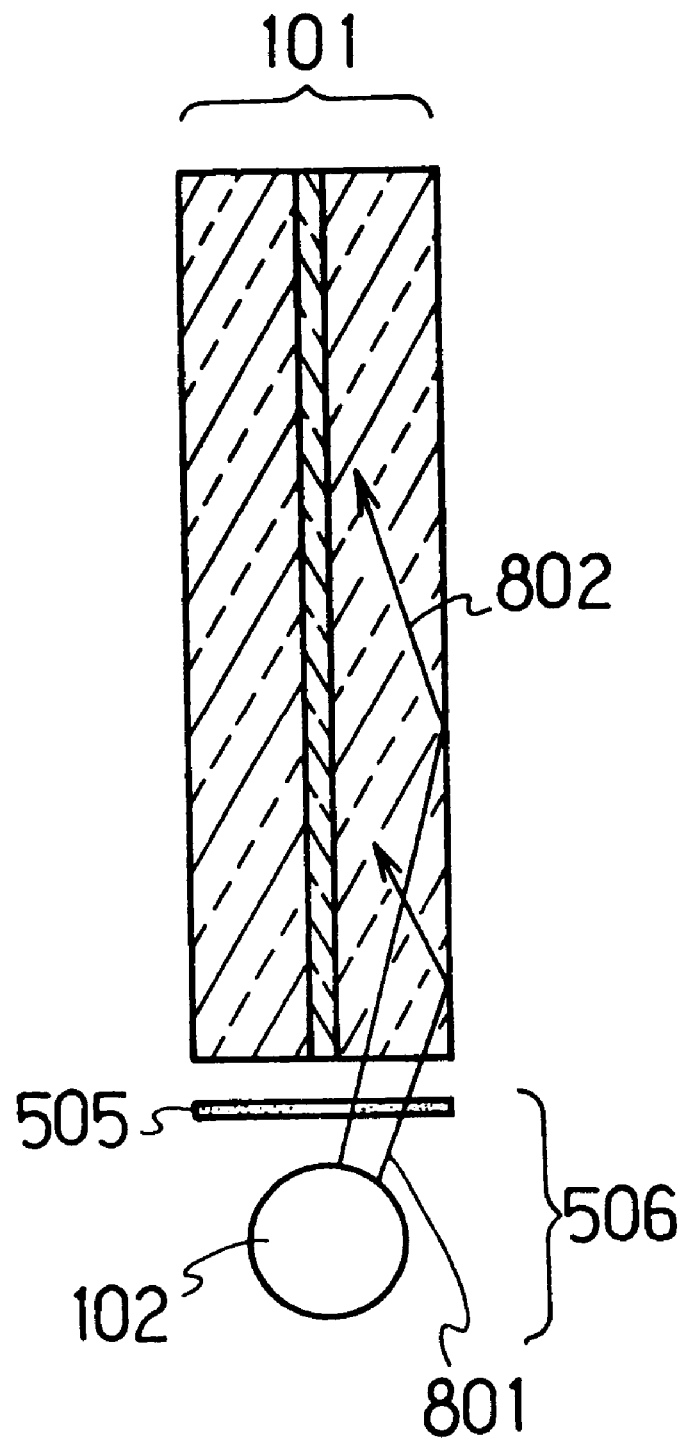
FIG. 8 is a cross section of the display device shown in FIG. 5 illustrating a function of making intensity distribution uniform over the display area.

As a variation of this embodiment, the transparency of the stop plate may vary along the cross direction such that the transparency is maximum in the middle and decreases gradually to the edges as shown in FIG. 7, by varying a thickness of the film formed on the substrate for limiting the transparency. FIG. 8 illustrates the cross section of the display device using such a stop plate. Among the light rays emitted from the cold-cathode tube 102, light rays 801 directed to the proximal portion of the display area attenuate largely as they pass the low transparency portion (edge portion) of the stop plate 505, while light rays 802 directed middle or distal portion of the display area attenuate little as they pass the high transparency portion (middle portion) of the stop plate 505. Thus, the light intensity, which may vary depending on the path length of the light propagating inside the transparent plate of the transparent type LCD 101, becomes uniform by the transparency distribution along the cross direction of the stop plate 505.

(Third Embodiment)

Figure 9:
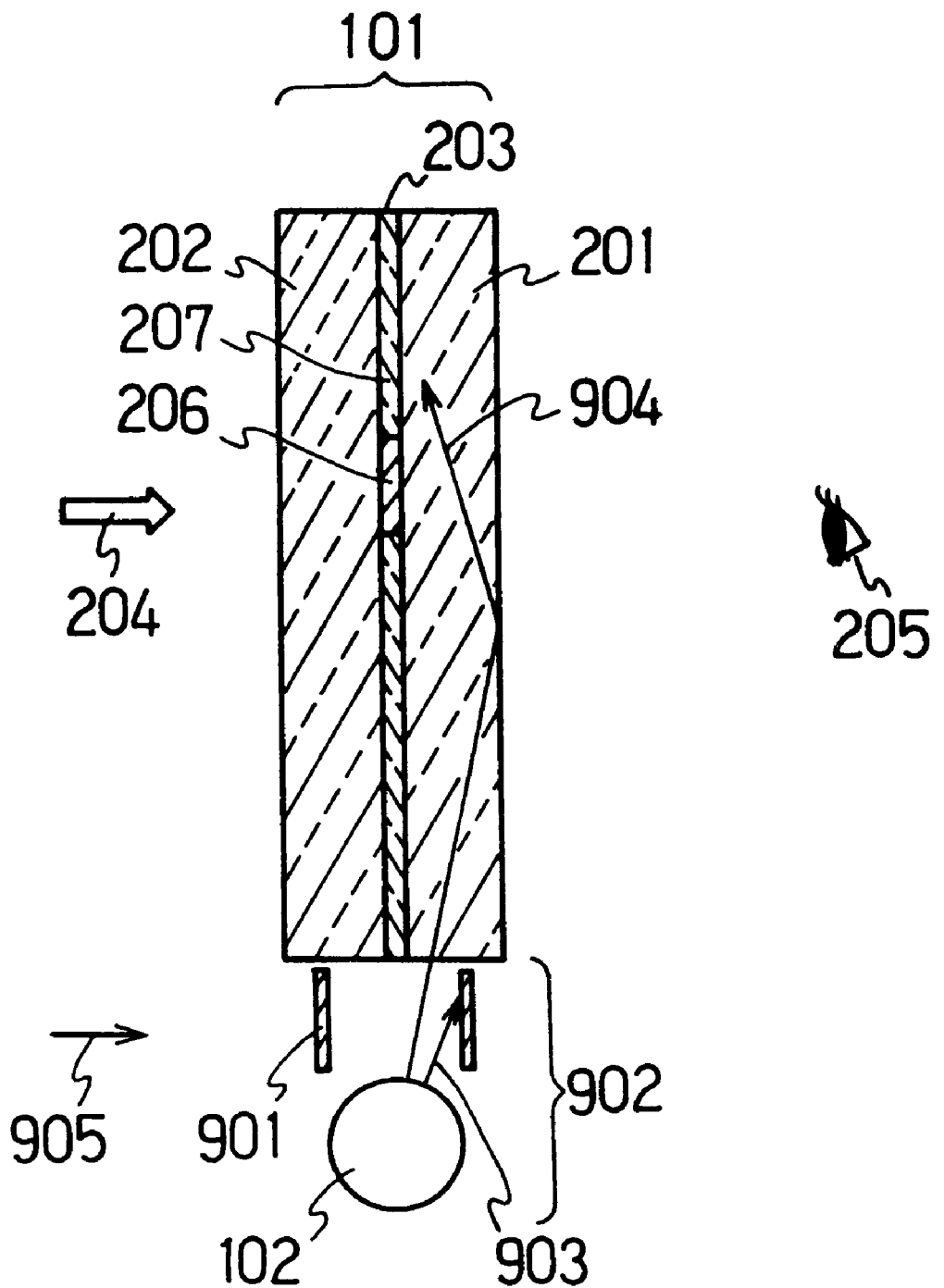
FIG. 9 is a cross section of a display device according to a third embodiment of the present invention.

FIG. 9 shows a cross section of a display device according to a third embodiment of the present invention. Transparent type LCD 101 comprises a polymer dispersed liquid crystal 203 that can be switched between a transparent state and a diffraction state in which light rays are scattered. The polymer dispersed liquid crystal 203 is disposed between two transparent plates 201, 202 on which transparent electrodes are formed. This transparent type LCD 101 displays images and/or characters by switching the state of the polymer dispersed liquid crystal pixel by pixel according to a signal from a conventional signal generator (not shown in the figure). Light system 902, which lights an edge face of each of the transparent plates 201, 202 for lighting the transparent type LCD, comprises a cold-cathode tube 102 and a pair of parallel plates 901 that extend in the direction of the longitudinal direction of the transparent type LCD 101. The pair of parallel plates 901 define an elongated space between the cold-cathode tube and the edge face of the transparent type LCD 101.

The polymer dispersed liquid crystal 203 is divided into transparent pixels 207 and diffraction (non-transparent) pixels 206 that scatter light rays in accordance with a signal from a signal generator. The transparent pixels 207 pass light rays from the outside view, which can reach the eyes 205 of an observer, while diffraction pixels 206 scatter the light rays and have a glittering appearence. Thus, the observer can see an image from the diffraction pixels 206 superimposed on the outside view.

The pair of parallel plates 901 of the light system 902 has a function to make the light intensity uniform over the whole display area of the transparent type LCD 101 from the proximal portion to the distal portion with respect to the light system 902. Light rays from the light system 902 enter the transparent plates 201, 202 from their proximal edge faces, and propagate inside of each of transparent plates 201, 202, which work as a light guide, to reach the distal edge faces of the transparent plates 201, 202. The light rays inside the transparent plates 201, 202 decay along with propagation due to the absorbing property of the transparent plates 201, 202. The above-mentioned pair of parallel plates 901 make the light intensity uniform over the whole display area by limiting light rays directed to the proximal portion of the display area as explained below.

As shown in FIG. 9, some light rays directed to the proximal portion of the display area are interrupted by one of the parallel plates 901 while light rays directed to the middle or distal portion of the display area are not interrupted by the pair of parallel plates 901. Thus, the light intensity becomes uniform over the whole display area. If all of the light rays that are directed to the proximal portion of the display area are interrupted by the parallel plates 901, the light intensity at the proximal portion may become too low. Therefore, the edge contours of the parallel plates 901 are shaped as explained below.

Figure 10:
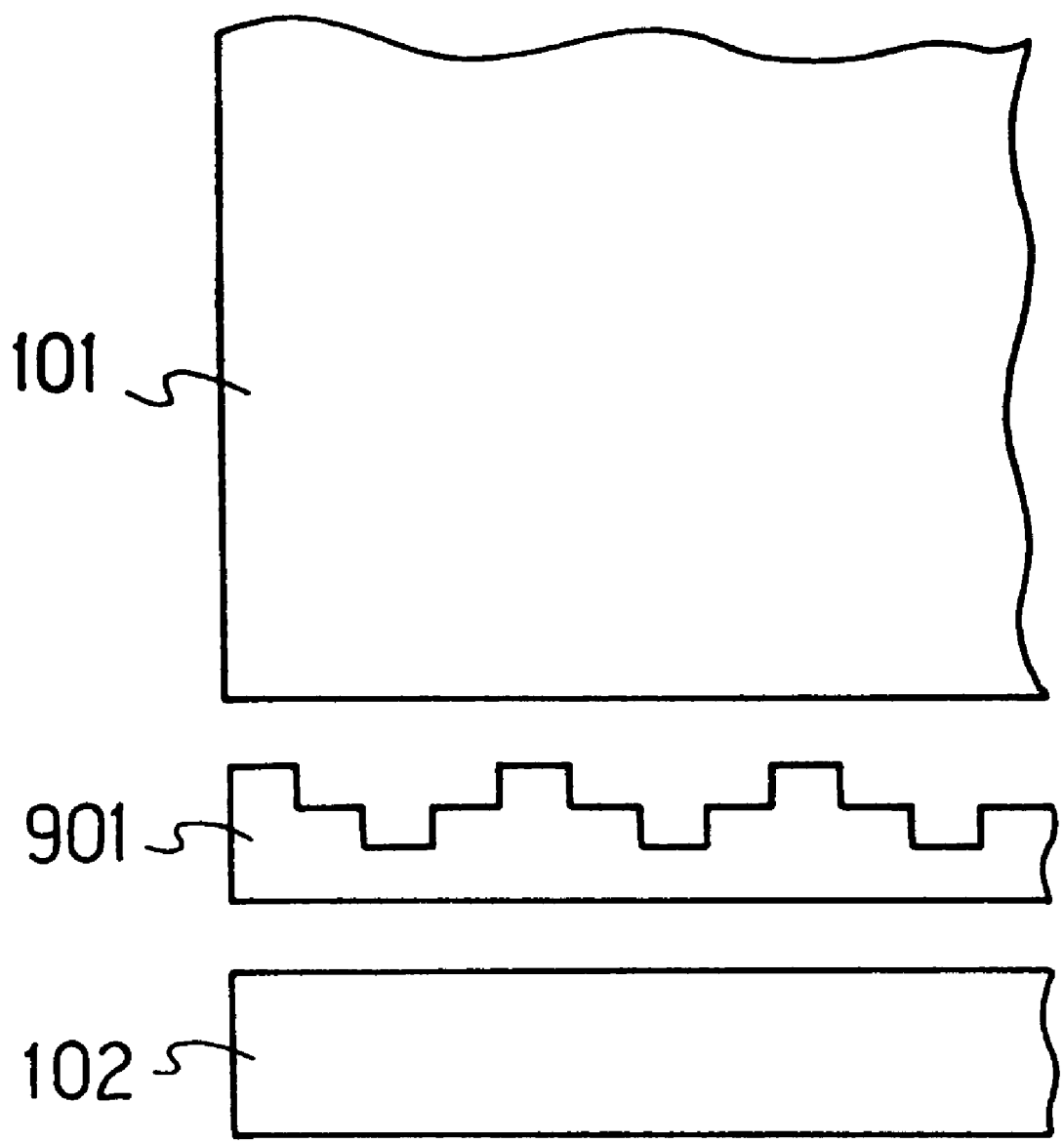
FIG. 10 is an enlarged partial elevation of the display device shown in FIG. 9 showing a contour of a pair of parallel plates constituting the light system of the display device.

FIG. 10 shows a partial contour of the display device of this embodiment viewed from the direction of arrow 905 in FIG. 9. As shown in this figure, the contour of the parallel plates 901 has a step and cyclic shape at the edge side close to the transparent plates along the longitudinal direction. Thus, light rays directed to the proximal portion of the display area are interrupted partially by the parallel plates 901, and the ratio of the interrupted light rays is higher in the portion closer to the light system.

Figure 11:
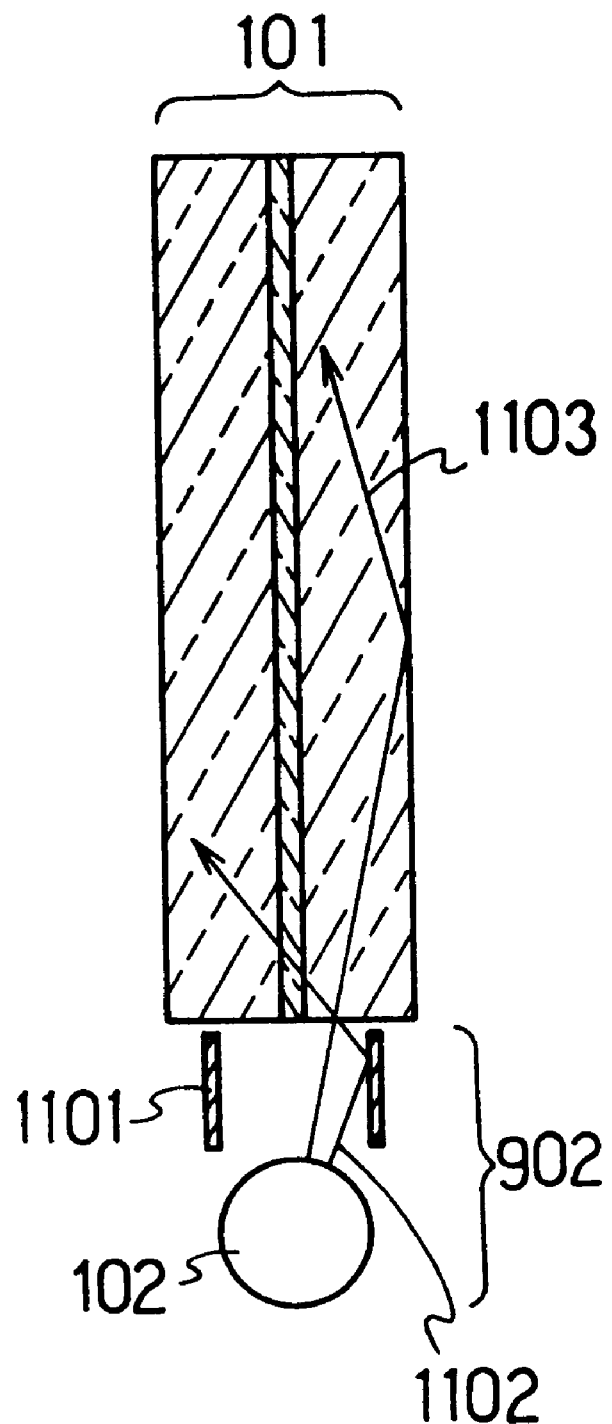
FIG. 11 is a cross section of a variation of the display device shown in FIG. 9.

As a variation of this embodiment, the display device shown in FIG. 11 has a pair of parallel plates 1101 having reflective inner surfaces facing each other. In this case, among light rays emitted from the cold-cathode tube 102, light rays 1102 directed to the proximal portion of the display area that is close to light system 902 are reflected by the inner surface of one of the parallel plates 1101, and enter one of the transparent plates from its edge face. Some of the light rays whose incident angle is small propagate in the transparent plate, and reach the distal portion of the display area. On the other hand, light rays 1103 that passed the space between the pair of parallel plates 1101 enter the transparent plate directly from its edge face, and reach the distal portion of the display area. Thus, the intensity of the distal portion is enhanced to make the intensity uniform over the whole display area. Additionally, compared with foregoing embodiments, the loss of light due to interruption is small, so that the utilization rate of light is improved.

(Fourth Embodiment)

Figure 12:
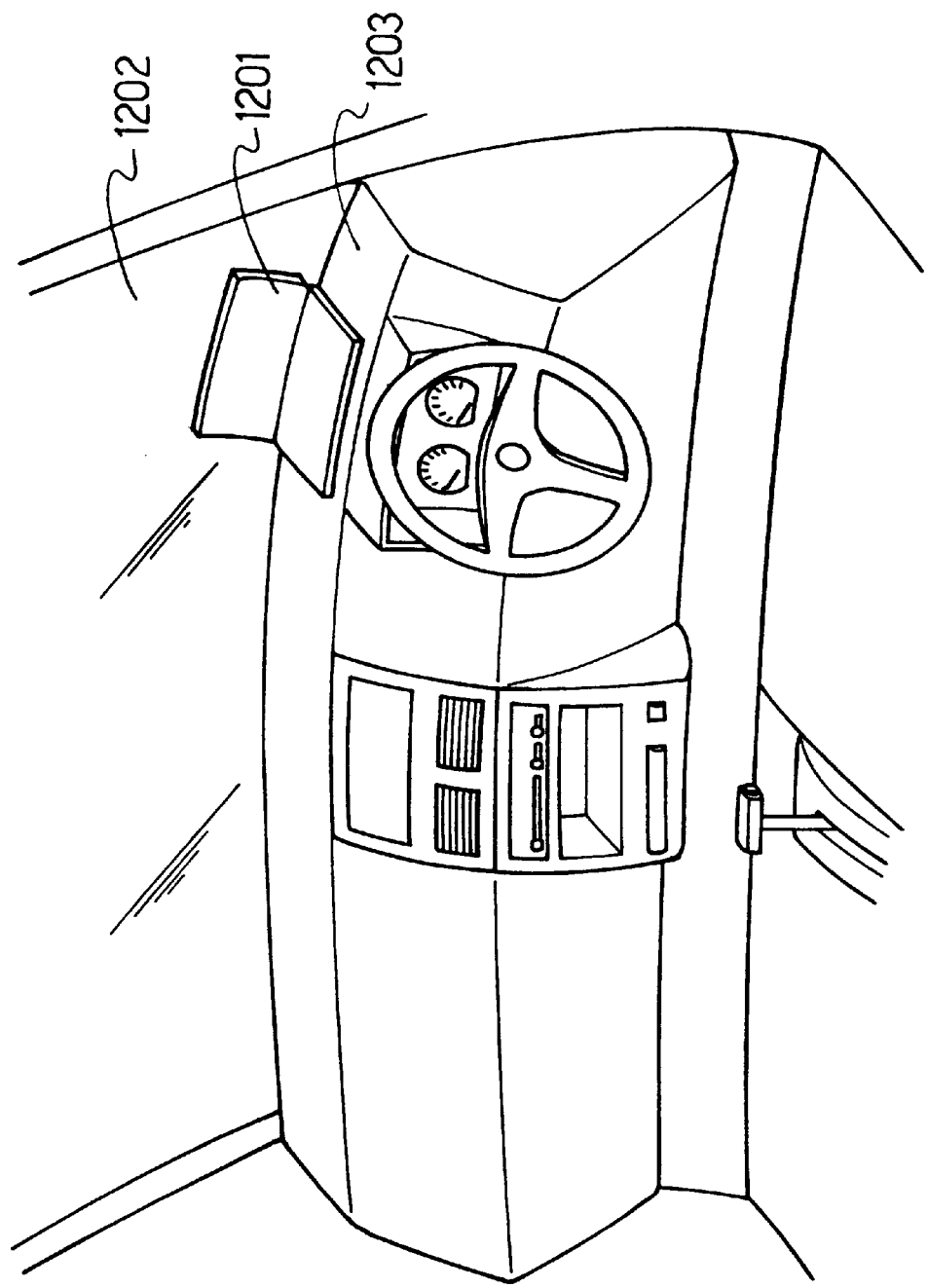
FIG. 12 is a perspective view of an application of the display device to a car navigation system.

FIG. 12 illustrates an example of the use of the display device according to the present invention as a display for a car navigation system. The display 1201 is placed on dash board 1203 in front of a driver, and as close as possible to windshield 1202. The driver can see information on the display 1201, superimposed on the outside view, with a small movement of eyes.

(Fifth Embodiment)

Figure 13:
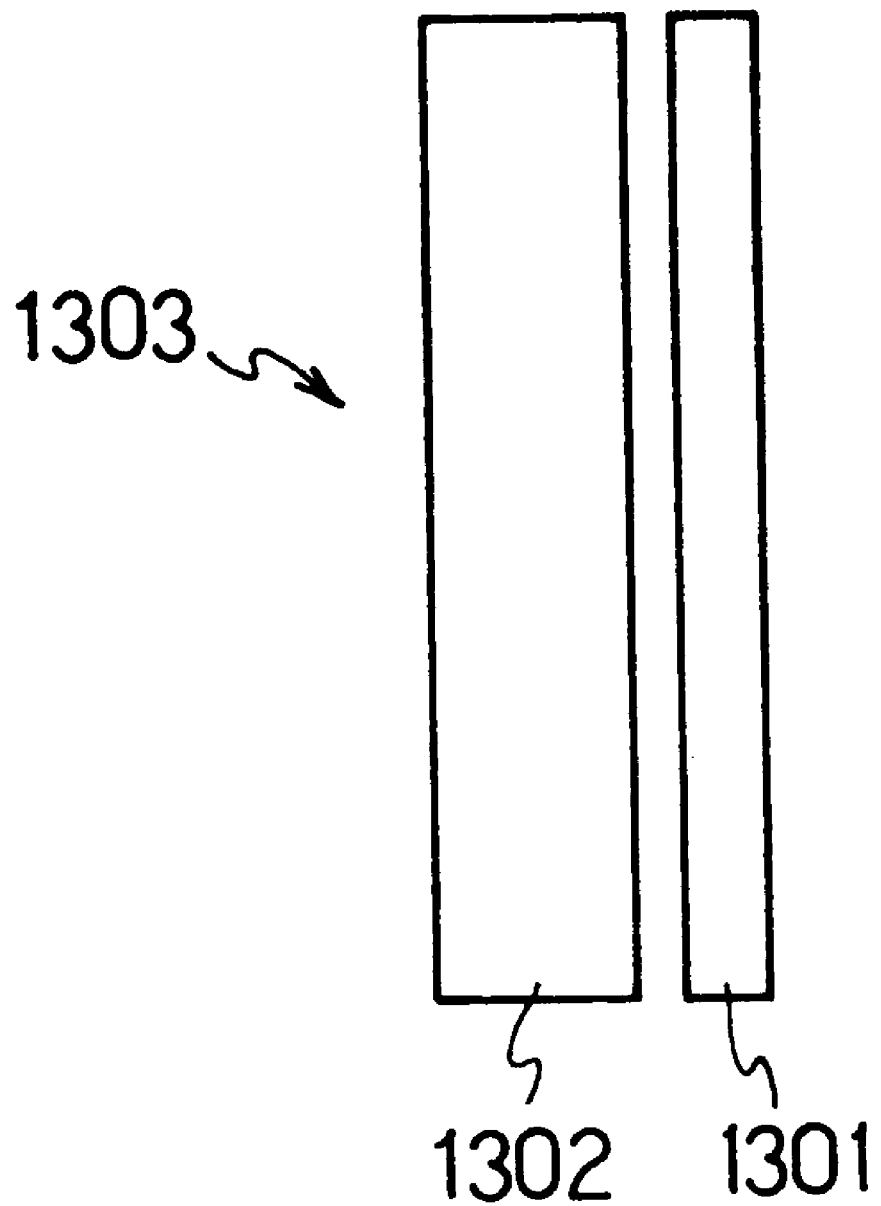
FIG. 13 is a side view of an application of the display device to a display of a measuring instrument.
Figure 14:
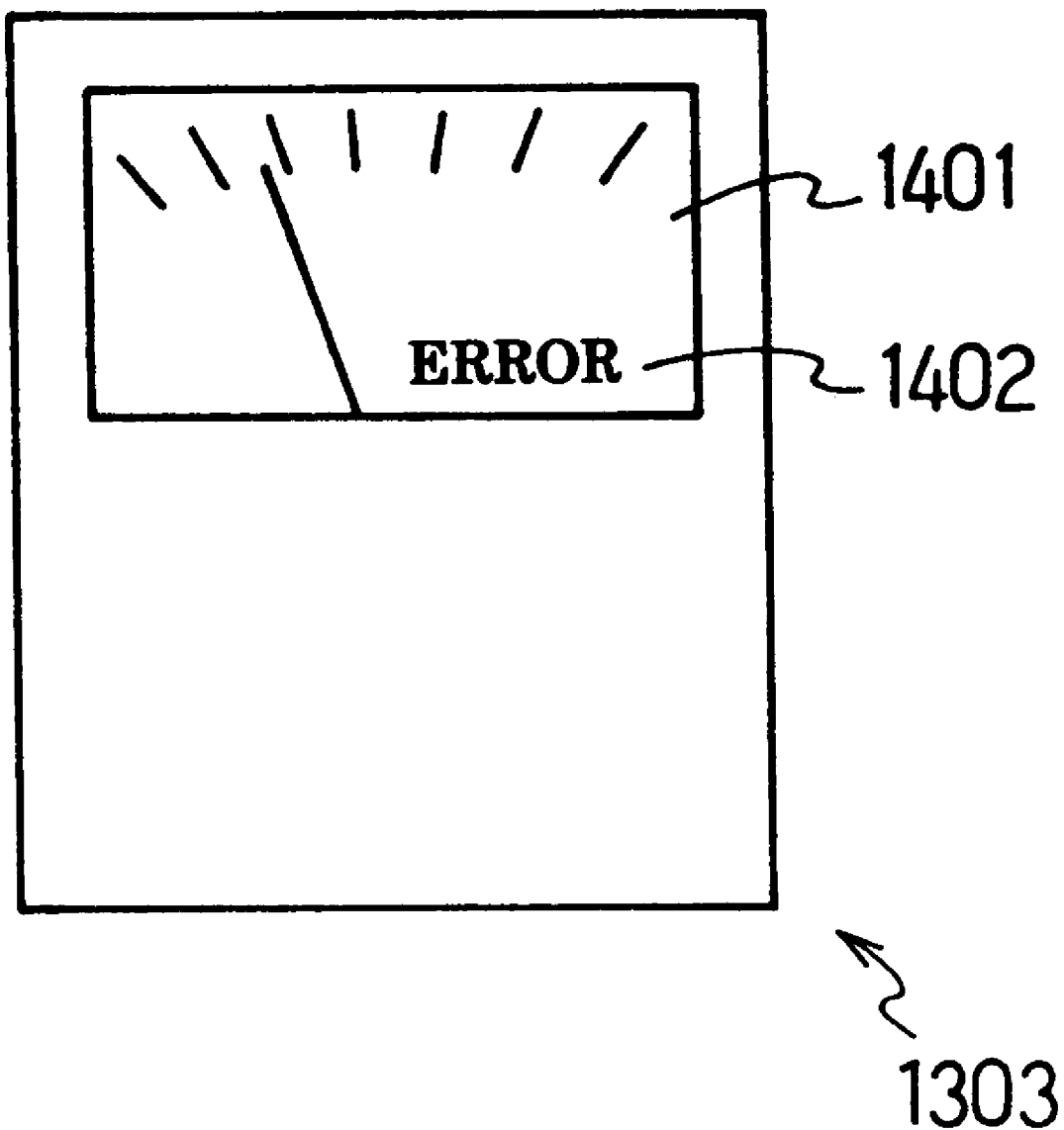
FIG. 14 is a front view of the measuring instrument shown in FIG. 13.

FIGS. 13 and 14 illustrate another example of the use of the display device according to the present invention as a display for a measuring instrument. As shown in FIG. 13, which is a side view, the measuring instrument 1303 comprises instrument body 1302 and display device 1301 disposed adjacent to a front panel of the instrument body 1302. As shown in FIG. 14, which is a front view, information 1402 such as a measuring condition or a measuring error indicated by the display device 1301 is superimposed on the normal information 1401 displayed on the front panel of the instrument body (meter) 1302. Therefore, an observer can confirm the measuring condition or know the measuring error for example without moving eyes from the front panel of the instrument body (meter) 1302.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

We claim:

1. A display device for displaying images or characters superimposed on an outside view, the device comprising:

a transparent type LCD including a pair of transparent plates facing each other, spaced with a predetermined gap, and a polymer dispersed liquid crystal disposed between the transparent plates, which can be switched between a transparent state and a diffraction state pixel by pixel to display images or characters;

a signal generator for giving display signals to the transparent type LCD; and a light system including a light source emitting light rays that enter the transparent plates from their edge faces, and a stop plate disposed between the edge faces of the transparent plates and the light source, the stop plate having an opening that extends along a longitudinal direction of the edge faces of the transparent plate, and a width of the opening in a cross direction changing along the longitudinal direction.

2. The display device according to claim 1, wherein the width of the opening changes step by step and cyclically.

3. A display apparatus for a car navigation system comprising the display device according to claim 1.

4. A display apparatus for a measuring instrument comprising the display device according to claim 1.

5. A display device for displaying images or characters superimposed on an outside view, the device comprising:

a transparent type LCD including a pair of transparent plates facing each other, spaced with a predetermined gap, and a polymer dispersed liquid crystal disposed between the transparent plates, which can be switched between a transparent state and a diffraction state pixel by pixel to display images or characters;

a signal generator for giving display signals to the transparent type LCD; and a light system including a light source emitting light rays that enter the transparent plates from their edge faces, and a stop plate disposed between the edge faces of the transparent plates and the light source, the stop plate including a transparent substrate and a low-transparency film formed on the substrate having an opening that makes a transparent area extending along a longitudinal direction of the edge face of the transparent plate, and a width of the transparent area in a cross direction changing along the longitudinal direction.

6. The display device according to claim 4, wherein the width of the transparent area changes step by step and cyclically.

7. A display apparatus for a car navigation system comprising the display device according to claim 5.

8. A display apparatus for a measuring instrument comprising the display device according to claim 5.

9. A display device for displaying images or characters superimposed on an outside view the device comprising:

a transparent type LCD including a pair of transparent plates facing each other, spaced with a predetermined gap, and a polymer dispersed liquid crystal disposed between the transparent plates, which can be switched between a transparent state and a diffraction state pixel by pixel to display images or characters;

a signal generator for giving display signals to the transparent type LCD; and a light system including a light source emitting light rays that enter the transparent plates from their edge faces, and a stop plate disposed between the edge faces of the transparent plates and the light source, the stop plate including a substrate and a film formed on the substrate for limiting the transparency, and the transparency of the stop plate varying along a cross direction such that the transparency is maximum in the middle and decreases gradually toward the edges.

10. A display apparatus for a car navigation system comprising the display device according to claim 9.

11. A display apparatus for a measuring instrument comprising the display device according to claim 9.

12. A display device for displaying images or characters superimposed on an outside view, the device comprising:

a transparent type LCD including a pair of transparent plates facing each other, spaced with a predetermined gap, and a polymer dispersed liquid crystal disposed between the transparent plates, which can be switched between a transparent state and a diffraction state pixel by pixel to display images or characters;

a signal generator for giving display signals to the transparent type LCD; and a light system including a light source emitting light rays that enter the transparent plates from their edge faces, and a pair of parallel plates facing each other and defining an elongated space between the edge faces of the transparent plates and the light source, an edge contour of the parallel plates on a side closer to the transparent plates changing along a longitudinal direction.

13. The display device according to claim 12, wherein the edge contour of the parallel plates has a step and cyclic shape along the longitudinal direction.

14. The display device according to claim 12, wherein the parallel plates have reflective inner surfaces facing each other.

15. A display apparatus for a car navigation system comprising the display device according to claim 12.

16. A display apparatus for a measuring instrument comprising the display device according to claim 12.

* * * * *